United States Patent [19]

Edele et al.

[11] 3,748,685
[45] July 31, 1973

[54] WINDSCREEN WIPER ARM FOR MOTOR VEHICLES

[75] Inventors: Reinhard Edele, Bietigheim-Metterzimmern; Kurt Bauer, Kleiningersheim, Wurttemberg; Christian Roth, Bietigheim, all of Germany

[73] Assignee: SWF-Spezialfabrik fur Autozubehor Gustav Rau GmbH, Bietigheim, Germany

[22] Filed: Mar. 3, 1972

[21] Appl. No.: 231,682

[30] Foreign Application Priority Data
Mar. 17, 1971 Germany.................. P 21 12 801.8

[52] U.S. Cl. ........................ 15/250.35, 287/53 WA
[51] Int. Cl. .............................................. B60s 1/32
[58] Field of Search.................. 15/250.31, 250.32, 15/250.34, 250.35; 287/53 WA

[56] References Cited
UNITED STATES PATENTS
2,844,839  7/1958  Krohm ........................ 15/250.35 X
3,061,866  11/1962  Krohm ............................ 15/250.35
3,099,030  7/1963  Zury ................................ 15/250.35
3,126,568  3/1964  Wubbe............................. 15/250.35

*Primary Examiner*—Peter Feldman
*Attorney*—John J. McGlew et al.

[57] ABSTRACT

A windshield wiper arm assembly for motor vehicles comprises a headpiece which has a recess which is adapted to engage over the wiper bearing which is rotatable or oscillatable. The assembly includes a hinge part which is pivotally mounted on the headpiece for movement toward and away from the wiper plane. The hinge part is of U-shaped construction and includes outer side walls which are formed with inwardly extending bearing sleeve portions which form annular sleeve bearings and which extend axially in a direction between the side walls. A rivet having a shank portion with a head at each end is engaged in the sleeve bearings and the heads are deformed against the bearing sleeves. A rivet bearing bush is secured around the shank portion of the rivet and locked between the side walls of the hinge part. The rivet bearing bush includes axially extending and radially indented recesses which accomodate the sleeve bearings therein.

6 Claims, 2 Drawing Figures

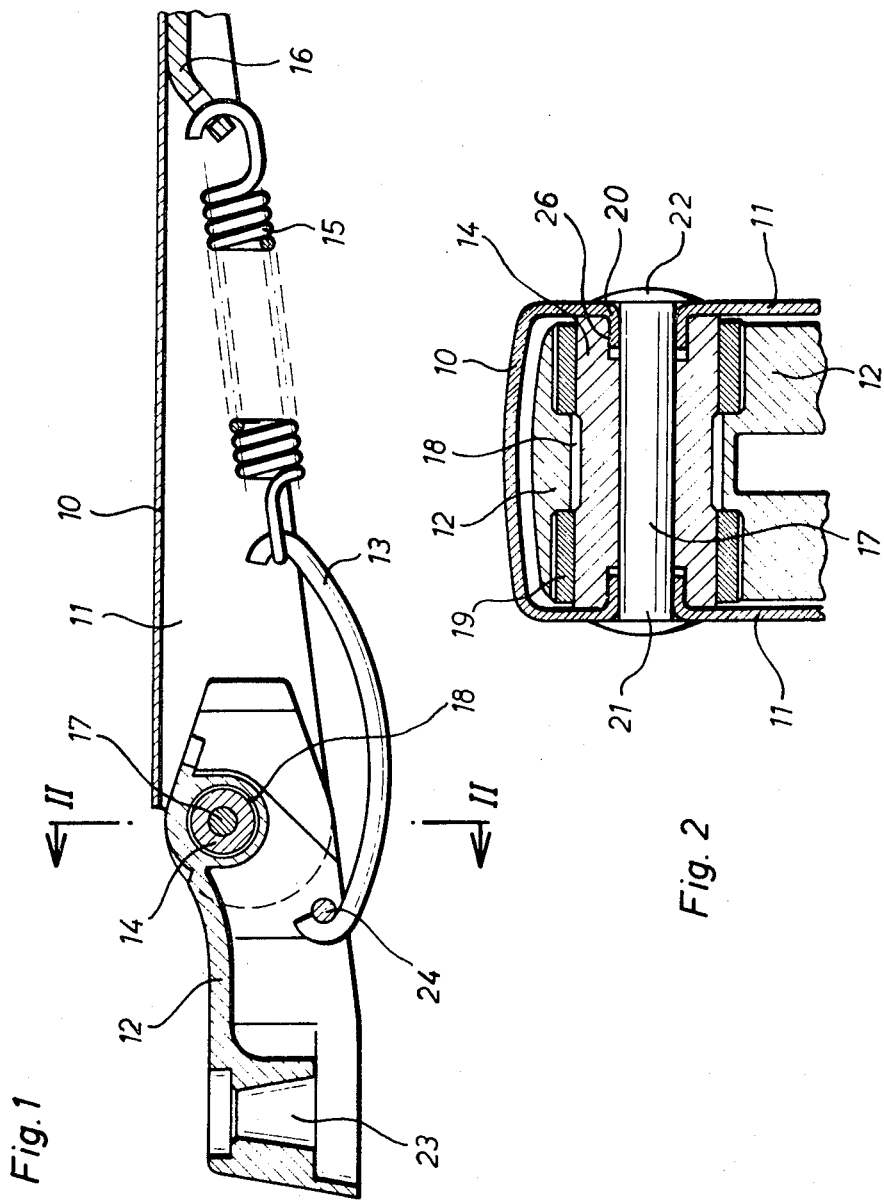

WINDSCREEN WIPER ARM FOR MOTOR VEHICLES

BACKGROUND OF THE INVENTION

1. Field of the Invention

This invention relates in general to the construction of windshield wipers and in particular to new and useful windshield wiper assembly which includes a headpiece which is adapted to be engaged over the rotatable drive shaft of the wiper and a hinge part which is pivoted to the headpiece for movement toward and away from the wiping plane and wherein the hinge part is made of a substantially U-shaped construction with side walls which are formed with inwardly extending cylindrical recesses to accomodate a bearing rivet having a bushing which is rotatable in a bearing bush carried on the headpiece. The cylindrical recesses are accomodated in the bearing bush in specially constructed axially extending recesses formed therein and the rivet is deformed in the area of the end of the sleeve bearings so that it is affixed thereto.

2. Description of the Prior Art

This invention concerns a windscreen wiper arm for motor vehicles, comprising a pivotal riveted connection between the wiper arm joint member and the wiper bearing head, wherein the side shanks of the wiper arm joint member carry, near the rivet opening, inwardly bent contact flanges which are secured between corresponding surfaces of a bearing bush slipped on the rivet joint and the rivet joint itself. Due to the rivet joint connection, the play in the joint is reduced and, in particular, the deflection of the joint between the wiper arm part of the joint and the wiper bearing head is prevented by transversely directed torques (tilting moments). Although the angled contact flanges of the wiper arm joint member and the corresponding contact surfaces of the bearing bush and the joint rivet may be inclined relatively to the longitudinal axis of the joint rivet, this makes the manufacture of the parts expensive, since the incline of all three parts must be exactly observed in order to achieve correct attachment of these parts in the joint.

SUMMARY OF THE INVENTION

It is the object of the present invention to simplify the joint rivet connection so that, although the manufacture of the parts of the joint is economical, a connection between the joint of the wiper arm and the head of the wiper bearing is obtained which is just as free from play and resistant to the transversely directed pull-out torques, between the wiper arm joint portion and the head of the wiper bearing.

This is achieved in accordance with the present invention which comprises a pivotal riveted connection between the wiper arm joint member and the wiper bearing head portion, wherein the side shanks of the wiper arm joint member carry, near the rivet opening, inwardly angled contact flanges which are secured between corresponding surfaces of a bearing bush slipped on the joint rivet and are secured to the joint rivet, characterised by the feature that the side shanks of the wiper arm joint portion are bent into cylindrically enlarged contact recesses of the bearing bush rivet opening and are secured in the bearing bush by means of the joint rivet. With this formation of the parts of the joint, it is possible to use an ordinary commercial joint rivet and the right angled bending of parts of the side shanks of the wiper arm joint member represents no difficulty to the problem of manufacture.

The securing of the wiper arm joint member to the joint rivet and the bearing bush is simply achieved by the feature that the contact recesses in the bearing bush are of a diameter equal to that of the joint rivet plus double the thickness of the side shank of the wiper arm joint member. The bent side shanks are absolutely secure in the bearing recesses of the bearing bush, due to the shaft of the joint rivet becoming deformed during the riveting process so that these parts can no longer twist relatively to each other.

For reasons of manufacuture it is proposed that the angled contact portions of the side shanks may be designed as sleeve-like contact attachments which are bent out of the side shanks by means of rounded edges. Since the protective covering of the wiper arm joint member readily breaks away near this bent edge, it is also proposed that the heads of the joint rivet should cover these rounded edges of the sleeve-like contact attachments.

The various features of novelty which characterize the invention are pointed out with particularity in the claims annexed to and forming a part of this disclosure. For a better understanding of the invention, its operating advantages and specific objects attained by its uses, references should be had to the accompanying drawing and descriptive matter in which there is illustrated a preferred embodiment of the invention.

BRIEF DESCRIPTION OF THE DRAWINGS

FIG. 1 shows the pivotal riveted connection between the wiper arm joint member and the wiper bearing head, in a longitudinal section of the wiper arm and FIG. 2 is a cross section through the pivotal riveted connection taken on the line II — II of FIG. 1.

The wiper arm head portion or headpiece 12 has a recess 23 for the wiper bearing (not shown) and is untwistably secured thereto so that in use the swinging rotary motion of the wiper bearing is transmitted to the wiper arm joint member 10 connected to the wiper bearing head portion 12. Mounted on the wiper arm joint member or hinge part 10 is the extension of the wiper arm rod 16 which carries the wiper blade and is suspended from the pressure spring 15. The other end of the spring 15 is suspended from a stirrup 13 which itself is suspended from a transverse pin 24 of the wiper bearing head portion 12. The side shanks 11 of the U-shaped wiper arm joint member 10 receive in bores the joint rivet 17 which secures the wiper arm joint member 10 rotatably to the wiper bearing head member 12. The side shanks 11 of the wiper arm joint member 10 are bent to form cylindrical sleeve-like contact attachments 20 near the rivet recesses and are inserted in correspondingly enlarged cylindrical contact recesses 26 on the front sides of the bearing bush 14. The contact attachments 20 are disposed within the corresponding recess 26 of the bearing bush 14, and contact the shaft of the joint rivet 17. The diameter of the cylindrical recesses 26 in the bearing bush 14 is adapted to the diameter of the joint rivet 17 plus double the thickness of the side shanks 11. When the joint rivet 17 is riveted, one of the rivet heads 21 or 22 being formed, the shank of the rivet is also deformed in the region of the contact attachments 20, so that these attachments become pressed against the contact recesses 26 of the bearing bush 14. The bearing bush 14, the wiper arm joint member 10 and the joint rivet 17 are then secured untwistably relatively to each other. The joint has no play of any kind and is able to withstand transversely directed tilting moments.

The bearing bush 14 is also rotatably mounted in the two component bushes 19. These component bushes 19 are untwistably secured in the wiper bearing head portion 12 at a predetermined spaced interval which is defined by the shoulders in the inner bore of the wiper bearing head portion 12. Between the two component bushes 19, the bearing bush 14 and the inner bore of the wiper bearing head portion 12 is a lubricating space 18.

With this joint rivet connection, transversally acting tilting moments can be reliably withstood by the enlarged contact surface between the wiper arm head portion 12, more particularly its angled contact attachments 20, and the joint rivet 17, on the one hand and the bearing bush 14, on the other hand, and thus avoid deflection of the joint.

What we claim is:

1. Windscreen wiper arm for motor vehicles, comprising a pivotal riveted connection between the wiper arm joint member and the wiper bearing head portion, wherein the side shanks of the wiper arm joint member carry, near the rivet opening, inwardly angled contact flanges which are secured between corresponding surfaces of a bearing slipped on the joint rivet and are secured to the joint rivet, characterised by the feature that the side shanks of the wiper arm joint portion are bent into cylindrically enlarged contact sleeves having walls paralled to the axis of the bearing bush rivet opening and are secured in the bearing bush by means of the joint rivet.

2. A windshield wiper arm for motor vehicles which has a windshield wiper drive shaft which is rotatable or oscillatable, comprising a headpiece having recess forming a wiper drive shaft receiving bearing for engaging the wiper drive shaft for movement therewith, a hinge part pivotally mounted on said headpiece for movement toward and away from the wiping plane and having opposite side walls with inwardly and axially extending bearing sleeve portions parallel to the axis of the rivet forming annular sleeve bearings, a rivet extending between said side walls and having a shank portion with a head at each end engaged against the respective sleeve bearing ends in fixed deformed interengagement, and a rivet bearing bush secured around said shank portion of said rivet and engaged between the interior side walls of said hinge part and having axially extending and radially indented recesses accomodating said sleeve bearings therein.

3. A windshield wiper arm according to claim 2, wherein the diameters of the recess portions of said bearing bush are equal to that of the diameter of the rivet plus double the thickness of said sleeve bearings.

4. A windshield wiper according to claim 2, wherein said rivet is deformed radially outward against said sleeve bearings which in turn are deformed in the recesses of said bearing bush.

5. A windshieled wiper arm construction according to claim 2, wherein said bearing bush includes a rounded end portion at the outer end of said recesses around which said sleeve bearings are bent.

6. A windshield wiper according to claim 2, wherein said head portions of said rivet cover the outer ends of said sleeve bearings.

* * * * *